(12) United States Patent
Wang (10) Patent No.: US 12,474,929 B2
(45) Date of Patent: Nov. 18, 2025

(54) DATA READ-WRITE CONTROL METHOD AND ELECTRONIC DEVICE

(71) Applicant: SHENZHEN ZOLON TECHNOLOGY CO., LTD., Shenzhen (CN)

(72) Inventor: Jian Wang, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/723,892

(22) PCT Filed: Oct. 18, 2022

(86) PCT No.: PCT/CN2022/125972
§ 371 (c)(1),
(2) Date: Jun. 25, 2024

(87) PCT Pub. No.: WO2023/124422
PCT Pub. Date: Jul. 6, 2023

(65) Prior Publication Data
US 2025/0068332 A1 Feb. 27, 2025

(30) Foreign Application Priority Data
Dec. 31, 2021 (CN) .......................... 202111679116.9

(51) Int. Cl.
*G06F 3/06* (2006.01)
*G06F 9/38* (2018.01)

(52) U.S. Cl.
CPC .............. *G06F 9/38* (2013.01); *G06F 3/0619* (2013.01); *G06F 3/0659* (2013.01); *G06F 3/0673* (2013.01)

(58) Field of Classification Search
CPC ........ G06F 9/38; G06F 3/0619; G06F 3/0659; G06F 3/0673
See application file for complete search history.

(56) References Cited

FOREIGN PATENT DOCUMENTS

CN 112416556 A 2/2021

*Primary Examiner* — Eric Cardwell
(74) *Attorney, Agent, or Firm* — ScienBiziP, P.C.

(57) ABSTRACT

The present application is suitable for a technical field of data processing, and provides a data read-write control method and an electronic device. The method includes: determining read-write parameters of target data, in response to a pre-write lock application request for the target data initiated by a first process; if the pre-write identification bit is a first bit value, feedbacking a pre-write approval instruction to the first process, setting the pre-write identification bit to a second bit value, and controlling the first process to perform a pre-write operation based on a requested pre-write lock; and performing a data editing operation on the target data, in response to a write lock application request for the target data initiated by the first process. By the method, mutual conflicts between write operations can be avoided, and exclusive duration of data during addressing can be reduced, thereby improving a shared reading capability of data.

20 Claims, 8 Drawing Sheets

FIG. 10

DATA READ-WRITE CONTROL METHOD AND ELECTRONIC DEVICE

This application claims a priority to Chinese Patent Application No. 202111679116.9 filed at the China National Intellectually Property Administration on Dec. 31, 2021, the entire contents of which are incorporated herein by reference.

FIELD

The present application relates to a technical field of data processing, and is in particular to a data read-write control method and an electronic device.

BACKGROUND

With continuous development of electronic technology, more and more information is stored electronically, which greatly improves an efficiency of information editing and transmission. In recent years, with an application of cloud technology, same data can be operated by a plurality of people at the same time, and an efficiency of editing electronic data can be further improved. However, when a plurality of processes operates on the same data at the same time, although the efficiency of editing electronic data is improved, it also brings new problems, that is, write operations between different processes may conflict with each other.

In an existing control technology of read-write data, in order to ensure an accuracy of editing data and avoid writing conflicts on the same data, a read-write lock can be configured so that there is only one write operation for the same data, and block other read operations on the same data during the write operation. However, if a data volume of a certain data is large, it will take a long time to complete an addressing process on an editing element when performing a write operation. If the read operations are blocked during the addressing process, an efficiency of read-write data will be greatly reduced, resulting in low concurrency efficiency.

BRIEF DESCRIPTION OF THE DRAWINGS

In order to more clearly illustrate a technical solutions in the embodiments of the present application, drawings that need to be used in the descriptions of the embodiments or the prior art will be briefly introduced below. Obviously, the drawings in the following description are merely some examples of the present application, those of ordinary skill in the art can also obtain other drawings based on the drawings without paying creative efforts.

DESCRIPTION

In order to make a purpose, a technical solution and advantages of the present application clearer, the present application will be further described in detail below in conjunction with the drawings and embodiments. It should be understood that the specific embodiments described here are only used to explain the present application, and are not intended to limit the present application.

In the embodiments of the present application, on a basis of the write identification bit in the read-write parameters, a corresponding pre-write identification bit is added. When a thread needs to perform a write operation that is addressed first, a pre-write lock application request can be initiated. When it is detected that the pre-write identification bit is the first bit value, the pre-write approval instruction is fed back to the thread, that is, the pre-write lock is requested from the thread, and the pre-write operation can be performed. During the pre-write operation, the thread can complete an addressing task and allow other processes to read the target data. After the addressing task is completed, the process can initiate a write lock application request, and perform subsequent data editing operation. By writing the target data, realizing concurrent operations on the same target data. The present application solves a problem of the existing control technology of read-write data, the existing control technology takes a long time to complete an addressing process on an editing element when performing a write operation on large data volume of data. The present application also solves a problem of the read operations are blocked during the addressing process, an efficiency of read-write data will be greatly reduced, resulting in low concurrency efficiency.

The data read-write control method provided by the embodiments of the present application can be applied to smart phones, servers, tablet computers, notebook computers, ultra-mobile personal computers (UMPC), netbooks, servers and other electronic devices. The embodiments of the present application do not impose any limitation on a specific type of the electronic device. In particular, the electronic device is specifically a cloud server, and the cloud server stores at least one shared data. According to different types of services provided, the cloud server may include servers that provide cloud services such as cloud documents, cloud computing, cloud applications, and cloud memory. The server can receive operations on target data initiated by each terminal (if the cloud service is a cloud document, the target data is specifically an electronic document; if the cloud service is cloud content, the target data can be a specific memory address index table), the server can configure corresponding processes for operations initiated by different terminals, so as to achieve a purpose of sharing the target data.

Figure 1:
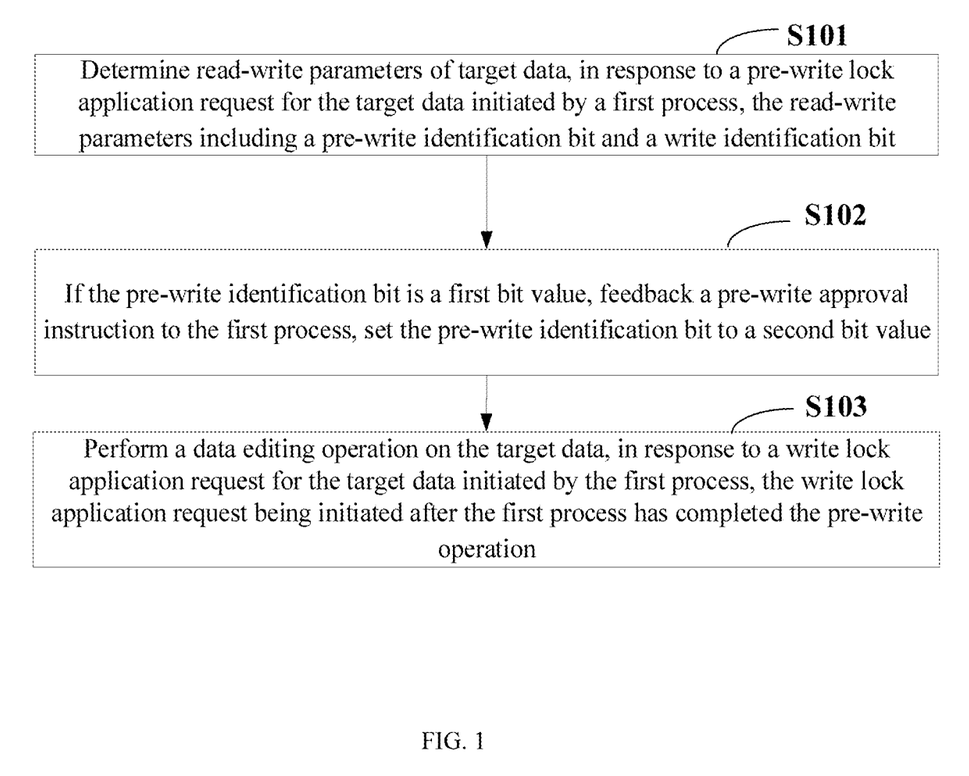
FIG. 1 is an implementation flowchart of a data read-write control method provided in a first embodiment of the present application.

As shown in FIG. 1, FIG. 1 shows an implementation flowchart of a data read-write control method provided in a first embodiment of the present application, which is described in detail as follows:

In S101, read-write parameters of target data are determined in response to a pre-write lock application request for the target data initiated by a first process, the read-write parameters include a pre-write identification bit and a write identification bit.

In this embodiment, when a user needs to edit the target data, such as modify, add or delete a certain element in the target data, the user can initiate the pre-write lock application request to an electronic device through a corresponding terminal. The electronic device can configure a process for different terminals, and each of the terminals can perform operations such as read-write the target data through an allocated process. In this case, the electronic device receives a request initiated by the terminal through the allocated process of the terminal. Therefore, when the terminal needs to perform a pre-write operation on the target data, the pre-write application request can initiate to the electronic device through a corresponding first process.

In this embodiment, each process may determine whether the process needs to perform a pre-write operation, according to whether an element address to be written has been determined. If the process has determined the element address to be written, the process can directly perform the write operation without the pre-write operation. In this case, the first process can initiate a write lock application request and perform a data editing operation directly. On a contrary, if a certain process has not determined the element address to be written, the element address to be written needs to be addressed, then the process needs to perform the pre-write operation before performing the write operation. Based on this, the first process needs initiate the pre-write lock application request to determine the element address to be written in a pre-write stage, and apply for a write lock after the element address to be written has been determined.

In a process of providing cloud services, if an amount of the target data is large, an addressing process is not completed instantaneously. Taking a provision of shared memory services as an example, a shared content database is configured with an index table based on a $B^+$-tree. Through a $B^+$-tree index, each process can determine a corresponding node and a position of each memory resource in the $B^+$-tree index, and then each process can complete an addressing of the memory resource. Therefore, the addressing process is time-consuming.

Figure 2:
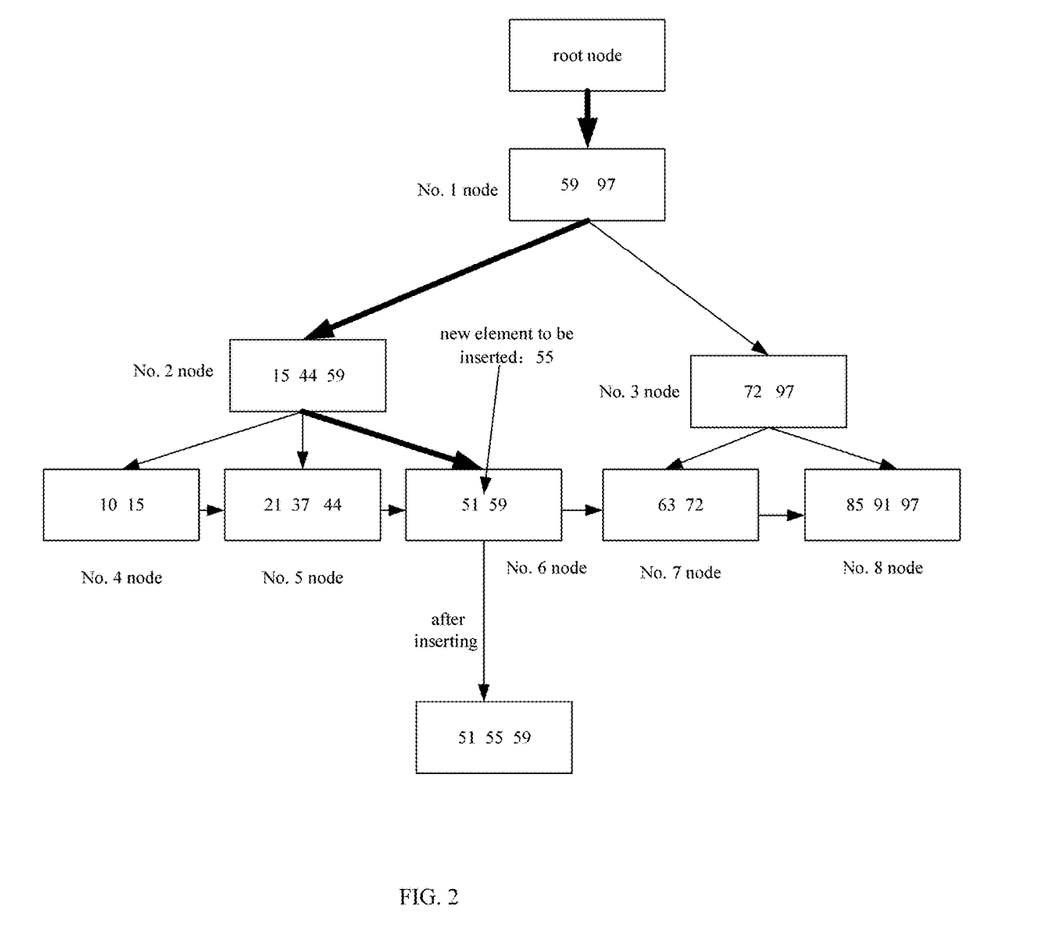
FIG. 2 is a schematic structural diagram of a $B^+$-tree index provided by an embodiment of the present application.

Exemplarily, FIG. 2 shows a schematic structural diagram of a $B^+$-tree index provided by an embodiment of the present application. As shown in FIG. 2, a write operation to the $B^+$-tree is nothing more than inserting elements and deleting elements. According to a nature of the $B^+$-tree, when a process needs to insert a new element into the $B^+$-tree index, a new element needs to be inserted into where a position of a leaf node needs to be determined. This process starts from a root node of the $B^+$-tree and searches until a leaf-level node. Assuming that the new element to be inserted is "55", the root node (No. 1 node) is found firstly, No. 2 node is found secondly, and then No. 6 node is found finally. A search path is a bold arrow in the figure. And the new element needs to be inserted into a second position of No. 6 node. After the process finds an insertion position, the new element can be inserted into a correct position of an appropriate leaf node. After inserting the new element, if the leaf node violates a balance property of the $B^+$-tree, the leaf node needs to be split into two adjacent brother nodes, and a split operation may be recursive until the root node, causing a tree structure to change. When deleting an element from the $B^+$-tree, the leaf node and a position of the element need to be found firstly, and then the element is deleted in a corresponding leaf node. After the element has been deleted, if the leaf node violates the balance property of the $B^+$-tree, two adjacent sibling nodes needs to be merged by borrowing elements. A merge operation may reach to the root node, causing a tree structure to change. From above analysis, it can be seen that no matter inserting an element or deleting an element, before the process performs the write operation on the $B^+$-tree index, if a node position corresponding to the element is not determined, there is a recursive search process from the root node to the leaf node, and this stage is just a pure data reading process, no data is written. That is, the index table is not actually modified, and there is no need to block all read operations. At the same time, a time required to search an element in a large $B^+$-tree index is not of a same order of magnitude as compared to a read operation that has already determined a node address, that is, a search operation takes much longer than the read operation based on the node address. Therefore, if all read operations are blocked during a search stage, an ability of data concurrency is greatly reduced. Therefore, in order to solve above problems, a pre-write stage is newly added in this embodiment. When the element address needs to be determined, the process can initiate the pre-write lock application request to the electronic device, in order to perform an addressing operation of an element that needs to be edited during a pre-write lock stage.

In this embodiment, the read-write parameters provided by the electronic device include the pre-write identification bit and the write identification bit. The pre-write identification bit can be represented as "pw", and the write identification bit can be represented as "write". When the electronic device receives the pre-write lock application request initiated by the first process, the electronic device needs to determine whether there is another process currently occupying a pre-write lock or a write lock. The electronic device needs to determine a bit value corresponding to the pre-write identification bit and a bit value corresponding to the write identification bit, that is, the electronic device needs to determine a state of the read-write parameters.

In this embodiment, the pre-write identification bit and the write identification bit are mutually exclusive parameters. Values of the pre-write identification bit and the write identification bit only have two values, i.e., a first bit value and a second bit value. Therefore, the pre-write lock and the write lock both are mutexes, the pre-write lock can be expressed as a "volatile unsigned charpw", the write lock can be expressed as a "volatile unsigned charwrite".

In a possible implementation manner, the read-write parameters also include a read identification bit, the read-write parameters can be specifically expressed as:

typedef struct
{
  volatileunsigned charpw; // mark that excludes writing
  volatileunsigned charwrite; // mark that excludes reading
  volatileunsigned int read; // number of read locks
}rwlock_t;

The read-write parameters have three identification bits:

The pre-write identification bit "pw", that is the pre-write lock, the pre-write lock is specifically a write lock mutex variable. When the pre-write identification bit is set to 1, other write operations are excluded, but other processes are allowed to share reads;

The write identification bit "write", that is the write lock, the write lock is specifically a read lock mutex variable. When the write identification bit is set to 1, any other process is excluded from reading and writing;

The reading identification bit "read": a read lock counter, records a number of processes (threads) currently holding a read lock.

In S102, if the pre-write identification bit is a first bit value, a pre-write approval instruction is fed back to the first process, the pre-write identification bit is set to a second bit value, and the first process is controlled to perform a pre-write operation based on a requested pre-write lock; when the pre-write identification bit is the second bit value, pre-write lock application requests and write lock application requests initiated by other process except the first process are blocked responses, and read lock application requests initiated by the other process are responded.

In this embodiment, if the electronic device detects that the pre-write identification bit is the first bit value in the read-write parameters of the target data, it means that a current pre-write lock is available, and the first process can be allowed to perform the pre-write operation at this time. The pre-write approval instruction is fed back to the first process, that is, the pre-write lock is sent to the first process, and the first process can perform the pre-write operation according to the requested pre-write lock, the pre-write operation is specifically for a required editing element for the addressing operation, refer to a related description of S101 for a specific process.

In this embodiment, in order to prevent other processes from performing pre-write operations and write operations, the electronic device configures the pre-write identification bit in the read-write parameters of the target data as the second bit value. That is, a lock operation is performed for the pre-write. When the pre-write identification bit is configured as the second value, pre-write application requests and write application requests of other threads are blocked to response. The pre-write identification bit is reconfigured to the first bit value, according to an order of applications, the pre-write application requests and the write application requests initiated by other threads are answered in turn.

In a possible implementation, a lock operation corresponding to the pre-write lock and the write lock can be expressed as lock(c_mutex_t*), and an unlock operation corresponding to the pre-write lock and the write lock can be expressed as unlock(c_mutex_t*), where "*" can be replaced by an identification corresponding to the pre-write lock and the write lock. Use a function "__sync_bool_compare_and_swap" to realize a lock function. After a lock is successfully added, a value of "c_mutex_t" is not zero, that is, the value of "c_mutex_t" is the second bit value. A function "__sync_lock_release" is used to realize a release function. After the lock is released, the value of "c_mutex_t" is zero, that is, the value of "c_mutex_t" is the first bit value.

In S103, a data editing operation on the target data is performed, in response to a write lock application request for the target data initiated by the first process, the write lock application request being initiated after the first process has completed the pre-write operation.

In this embodiment, after the first process completes the pre-write operation, the first process can initiate the write lock application request to the electronic device. At this time, the first process has completed an addressing operation of an element, and the first process can directly edit the element. The data editing operation can be performed on the target data, such as modifying or deleting any element in the target data, or adding new elements to the target data. If the target data is a $B^+$-tree index, nodes in the $B^+$-tree index can be deleted, modified, or new nodes can be added.

It can be seen from above that a data read-write control method provided by the embodiment of the present application, on a basis of the write identification bit in the read-write parameters, a corresponding pre-write identification bit is added. When a thread needs to perform a write operation that is addressed first, a pre-write lock application request can be initiated. When it is detected that the pre-write identification bit is the first bit value, the pre-write approval instruction is fed back to the thread, that is, the pre-write lock is requested from the thread, and the pre-write operation can be performed. During the pre-write operation, the thread can complete an addressing task and allow other processes to read the target data. After the addressing task is completed, the process can initiate a write lock application request, and perform subsequent data editing operation. By writing the target data, realizing concurrent operations on the same target data. Compared with the existing control technology of read-write data, the present application enters a pre-write stage before writing data, and the process can complete an addressing operation through the pre-write lock. Allowing other read operations in the pre-write stage can avoid conflicts between write operations and at the same time reduce exclusive time of data during an addressing process, greatly improving a shared read ability of data.

Figure 3:
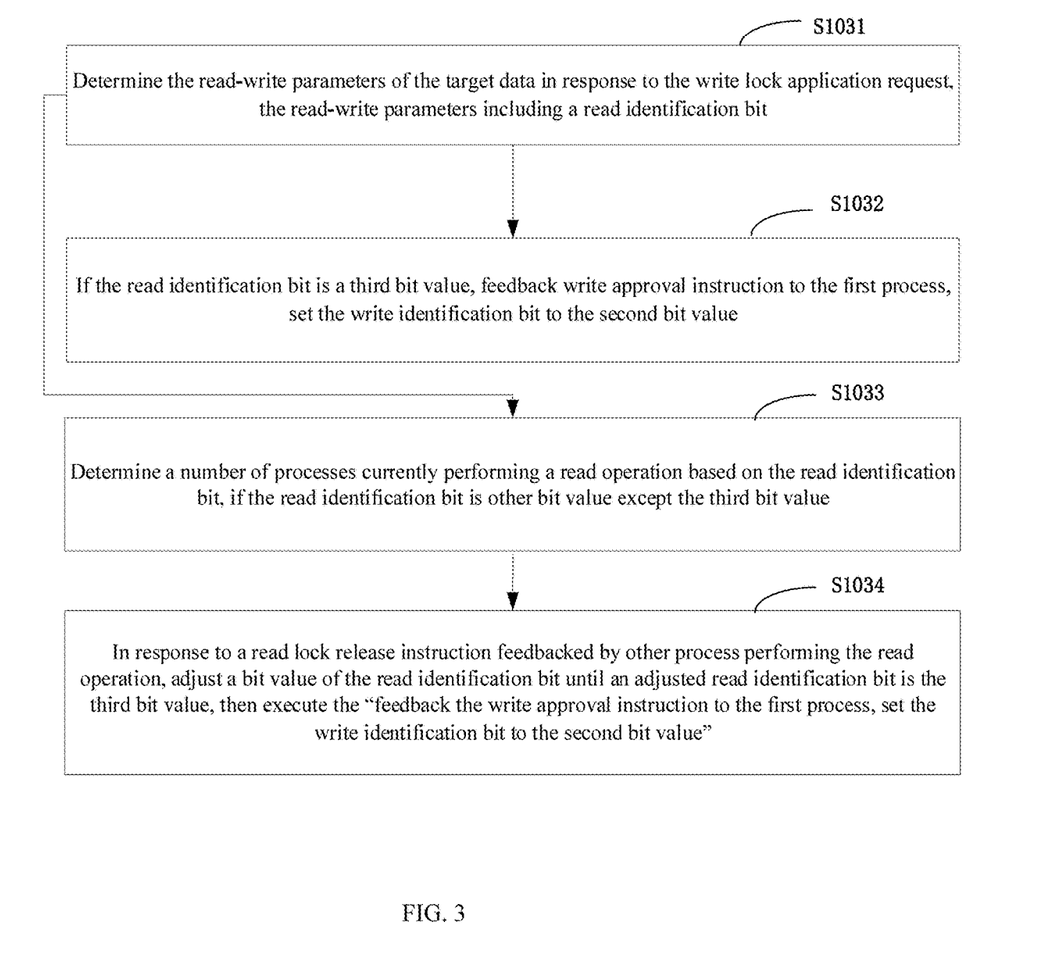
FIG. 3 is a specific implementation flowchart of S103 in a data read-write control method provided in a second embodiment of the present application.

FIG. 3 shows a specific implementation flowchart of S103 in a data read-write control method provided in a second embodiment of the present application. As show in FIG. 3, compared to an embodiment described in FIG. 1, S103 in the data read-write control method provided by this embodiment includes S1031 to S1034, which are detailed as follows:

Further, performing the data editing operation on the target data, in response to the write lock application request for the target data initiated by the first process includes:

In S1031, the read-write parameters of the target data are determined in response to the write lock application request, the read-write parameters including a read identification bit.

In this embodiment, since the first process is in a process of performing the pre-write operation, the electronic device can allow other processes to perform a read operation, but in order to avoid data conflicts, in a process of reading the target data, the target data is not allowed to modify, and avoid inconsistency between a read value and a modified value. When the first process initiates a write lock application request after completing the pre-write operation, the electronic device needs to re-read the read-write parameters of the target data. The read-write parameters include a read identification bit.

In this embodiment, if the read identification bit is the third bit value, it means that no other process currently performs a read operation on the target data, that is, no process has a read lock. In this case, then an operation of S1032 is performed. Otherwise, if the read identification is other than the third bit value, it means that there is currently a process performing the read operation on the target data, and at this time, an operation of S1033 is performed.

In a possible implementation manner, when the electronic device receives the write lock application request initiated by the first process, the electronic device blocks responses to the read lock application requests initiated by other processes, that is, other processes are not allowed to perform read operations.

In S1032, if the read identification bit is a third bit value, a write approval instruction is fed back to the first process, the write identification bit is set to the second bit value, and the first process is controlled to perform the data editing operation based on a requested write lock; the pre-write lock application requests are blocked responses, the write lock application requests and the read lock application requests initiated by the other process, when the write identification bit is the second bit value.

In this embodiment, if the read identification bit is a third bit value, it means that no other process currently performs a read operation, and the third bit value can be zero, or other preset values. At this time, the electronic device can feedback the write approval instruction to the first process, that is, a lock operation is performed on the write lock, and the write identification bit is configured as the second bit value. After the write approval instruction is received, the first process may perform a data editing operation on the target data based on the applied write lock. In a state where the write identification bit is the second bit value, responses to all pre-write application requests, write application requests, and read lock application requests for the target data are blocked, which is a write exclusive operation.

Further, after determining the read-write parameters of the target data in response to the write lock application request, the data read-write control method further includes:

In S1033, a number of processes currently performing a read operation is determined based on the read identification bit, if the read identification bit is other bit value except the third bit value.

In this embodiment, if the read identification bit is other bit value except the third bit value, it means that there are currently other processes performing read operations on the target data, and all read operations need to be completed before performing the write operation. In this case, the electronic device may determine the number of processes that are currently performing the read operation according to the read identification bit.

In S1034, in response to a read lock release instruction feedbacked by other process performing the read operation, a bit value of the read identification bit is adjusted until an adjusted read identification bit is the third bit value, then the "the write approval instruction is fed back to the first process, the write identification bit is set to the second bit value" is executed.

In this embodiment, after other processes complete the read operation, the read lock release instruction can be initiated to the electronic device, and the electronic device can unlock the read lock according to the read lock release instruction, reduce the bit value of the read identification bit. If the electronic device detects that the adjusted read identification bit is changed to the third bit value, it means that all processes have finished reading, and at this time the write operation can be performed. At this time, the write approval instruction can be fed back to the first process, so that the first process executes the data editing operation according to a requested write lock.

In this embodiment, a priority of the pre-write lock application request is higher than a priority of the write lock application request, and the priority of the write lock application request is higher than a priority of the read lock application request.

Figure 4:
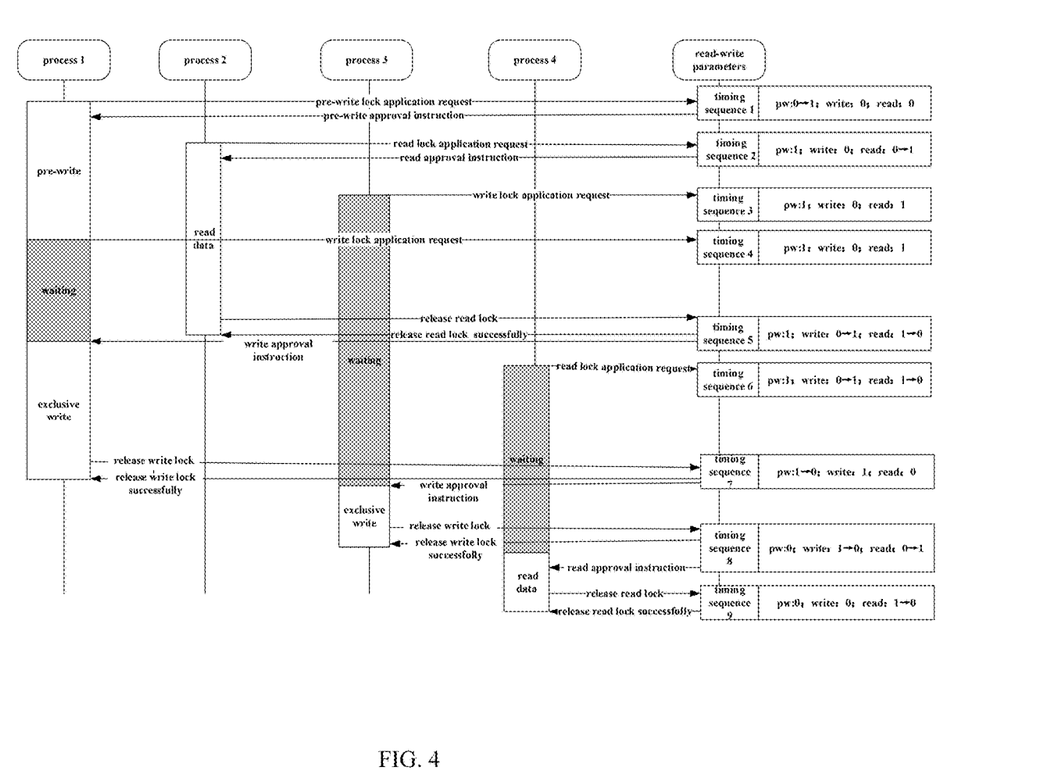
FIG. 4 is a schematic diagram of timing sequence of multi-thread concurrency provided by an embodiment of the present application.

Exemplarily, FIG. 4 shows a schematic diagram of timing sequence of multi-thread concurrency provided by an embodiment of the present application. As shown in FIG. 4, the electronic device includes four processes. According to a read-write operations of the four processes on the target data, a bit value of each identification bit in a corresponding read-write parameters (that is, the read-write lock) can be changed. The target data is protected through the read-write lock, such as $B^+$-tree index structures. In a multi-process (or thread) concurrent environment, whether it is a read operation or a write operation on the target data, each process is necessary to first apply for a lock that is protected, and only after obtaining a permission of the lock can the resource be accessed. As shown in an example shown in FIG. 4, process 1 and process 3 need to perform data editing operations on the target data, process 1 can be equivalent to the first process in the above embodiment. Wherein, process 1 does not determine an element address, and process 3 has been determined the element address, process 2 and process 4 need to read data. There are nine read-write operation sequences in total, and their timing corresponds to numbers 0-9 marked on the right.

The following is an analysis of the operation timing in the figure:

1) When process 1 needs to edit the target data, because the element address has not been determined, the process 1 applies to the electronic device for a "pre-write lock", that is, the process 1 initiates a pre-write lock application request. At this time, since no other process holds a lock (that is, the pre-write lock is the first bit value in the read-write parameters), the process 1 successfully applies for the "pre-write lock" and enters a pre-write state.
2) Process 2 needs to read data and apply for a "read lock" from the electronic device. Since no other process holds an exclusive write lock at this time, that is, the write identification bit is the first bit value. Although the process 1 holds a pre-write lock, a shared read is still allowed at this time, the process 2 successfully acquires a "read lock" and enters a state of reading data. A number of read locks of the electronic device equals one, that is, the read identification bit is set to one.
3) When process 3 needs to edit the target data, since the element address has been determined, the process 3 can directly apply for a "write lock" to the electronic device, that is, the process 3 initiates a write lock application request, but at this time the process 1 holds a "pre-write lock", the process 3 cannot acquire the write lock immediately and enters a waiting state.
4) After the process 1 completes a pre-write (reading relevant data), the target data needs to be formally edited. A "write lock" is requested from the electronic device. That is, a write lock application request is initiated, the pre-write lock is converted to the exclusive write lock, but the process 2 holds the read lock at this time, the number of read locks is greater than zero, the read identification bit is not the third bit value, the process 1 cannot immediately acquire the write lock and enters the waiting state.
5) The process 2 releases the read lock. At this time, the number of read locks in the electronic device is cleared, that is, the read identification bit is changed to the third bit value again. Both the process 1 and the process 3 are in the waiting state, but the process 1 already holds the pre-write, and the pre-write has a higher priority, so the process 1 obtains the exclusive write lock and enters a write state.
6) Process 4 applies for a "read lock" to the electronic device, but the process 1 holds the exclusive write lock at this time, so the process 4 cannot obtain the read lock immediately and enters a waiting state.
7) The process 1 releases the write lock. At this time, both the process 3 and the process 4 are in the waiting state, but the write lock has a higher priority than the read lock, so the process 3 obtains the write lock first and enters the write state.

8) The process 3 releases the write lock. At this time, only the process 4 is in the waiting state, so the process 4 obtains the read lock and enters the read state. The number of read locks in the electronic device is one.

9) The process releases the read lock, and the number of read locks in the electronic device is cleared.

In the embodiment of this application, before responding to the write operation of the process, it is necessary to determine whether there is currently a process performing a read operation, so as to ensure an accuracy of the read operation, and also realize the read sharing in the pre-write stage, improving data concurrency.

Figure 5:
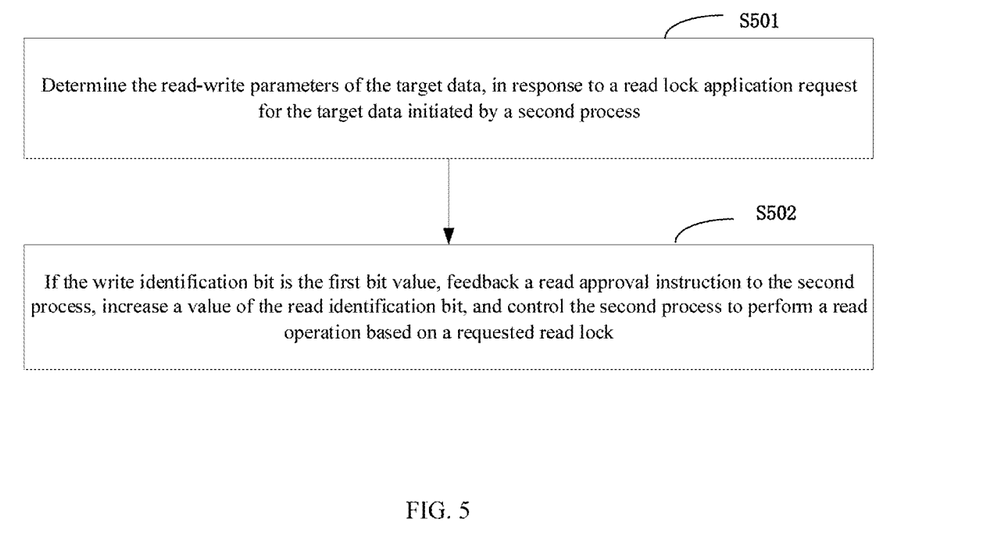
FIG. 5 is a specific implementation flowchart of a data read-write control method provided by a third embodiment of the present application.

FIG. 5 shows a specific implementation flowchart of the data read-write control method provided by the third embodiment of the present application. Referring to FIG. 5, compared with the embodiment described in FIG. 1, the data read-write control method provided by this embodiment also includes S501 to S502, which are detailed as follows:

In S501, the read-write parameters of the target data are determined, in response to a read lock application request for the target data initiated by a second process, the read-write parameters including a read identification bit.

In this embodiment, when the target data needs to be read, the second process can initiate a read lock application request to the electronic device. At this time, the electronic device can determine the read-write parameters of the target data and determine whether the read operation is currently allowed.

In S502, if the write identification bit is the first bit value, a read approval instruction is fed back to the second process, a bit value of the read identification bit is increased, and the second process is controlled to perform a read operation based on a requested read lock.

In this embodiment, if the write identification bit is the first bit value, it means that there is no exclusive write lock at present, and no matter whether there is a pre-write lock, the read operation can be performed. At this time, the read approval instruction can be fed back to the second process, that is, the second process obtains the read lock, the second process can perform a read operation on the target data, and increase the bit value of the read identification bit to record the number of processes currently performing the read operation.

Exemplarily, if the target data is a B$^+$-tree index, an implementation process of the pre-write lock for reading elements in the B$^+$-tree is as follows:

a) First, the second process applies to the electronic device for adding a read lock to the B$^+$-tree, that is, a read lock application request;

b) After the electronic device successfully applies for the read lock (the read identification bit is incremented by one, and the write identification bit is the first bit value at this time), that is, the second process starts to search the B$^+$-tree, starting from a root node, finds a leaf node where an element is located and a location;

c) After the second process search is completed (that is, after the reading is completed), regardless of the result, the read lock is released (the reading identification bit is reduced by one), and a process ends.

In the embodiment of the present application, when a read lock application request is received, the bit value of the write identification bit is read to determine whether there is currently a process performing a data editing operation, thereby ensuring an accuracy of the read operation.

Figure 6:
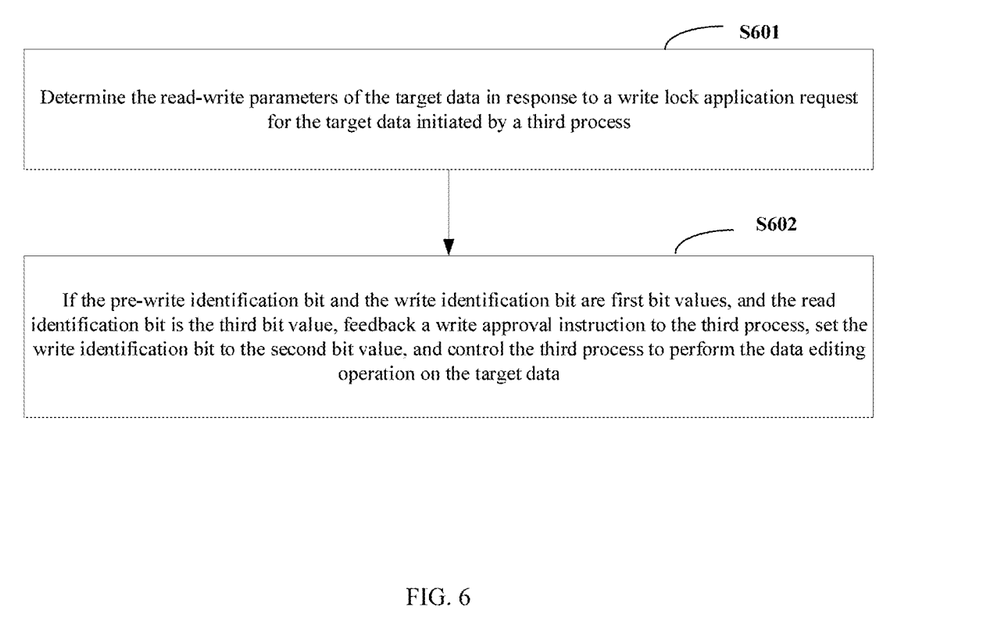
FIG. 6 is a specific implementation flowchart of a data read-write control method provided in a fourth embodiment of the present application.

FIG. 6 shows a specific implementation flowchart of the data read-write control method provided in the fourth embodiment of the present application. Referring to FIG. 6, compared to the embodiment described in FIG. 1, the data read-write control method provided by this embodiment further includes: S601 to S602, which are described in detail as follows:

In S601, the read-write parameters of the target data are determined in response to a write lock application request for the target data initiated by a third process, the read-write parameters includes a read identification bit.

In S602, if the pre-write identification bit and the write identification bit are first bit values, and the read identification bit is the third bit value, a write approval instruction is fed back to the third process, the write identification bit is set to the second bit value, and the third process is controlled to perform the data editing operation on the target data.

In this embodiment, when the third process has determined an element address to be edited in the target data, it can initiate a write lock application request to the electronic device. At this time, the electronic device needs to determine whether there is currently a process holding a pre-write lock and an exclusive write lock, and determine whether there is a process holding a read lock, that is, in the read-write parameters, the pre-write identification bit and the write identification bit are the first bit value, and the read identification bit is the third bit value. If all above conditions are met, then in response to the write lock application request, the third process is allowed to perform the write operation. On the contrary, if any of the above conditions are not met, it needs to wait.

Figure 7:
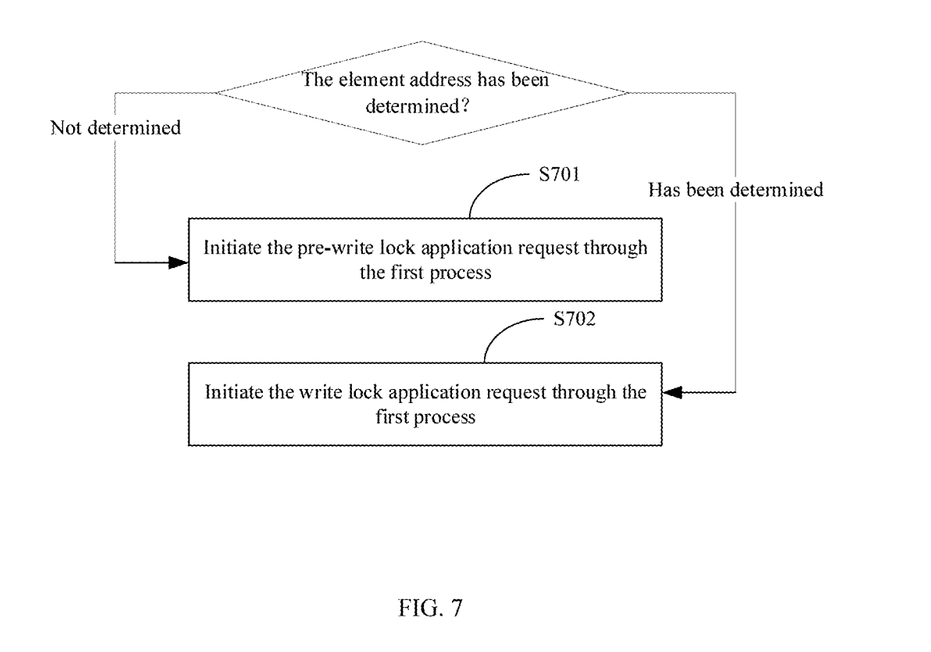
FIG. 7 is a specific implementation flowchart of a data read-write control method provided by a fifth embodiment of the present application.

FIG. 7 shows a specific implementation flowchart of the data read-write control method provided by the fifth embodiment of the present application. Referring to FIG. 7, compared to the embodiment described in any one of FIG. 1 to FIG. 6, the data read-write control method provided by this embodiment further includes: S701 to S702, which are described in detail as follows:

Before in response to the pre-write lock application request for the target data initiated by the first process, further includes:

In S701, the pre-write lock application request is initiated through the first process, if an element address of the data editing operation is not determined;

In S702, the write lock application request is initiated through the first process, if the element address of the data editing operation has been determined.

In this embodiment, the first process may determine whether to directly initiate a write lock application request or a pre-write lock application request according to whether the element address is determined. Since determining the element address requires a certain amount of addressing time, it is not necessary to apply for an exclusive write lock during the addressing process, but to apply for a pre-write lock, which can improve an ability to share data reads.

Figure 8:
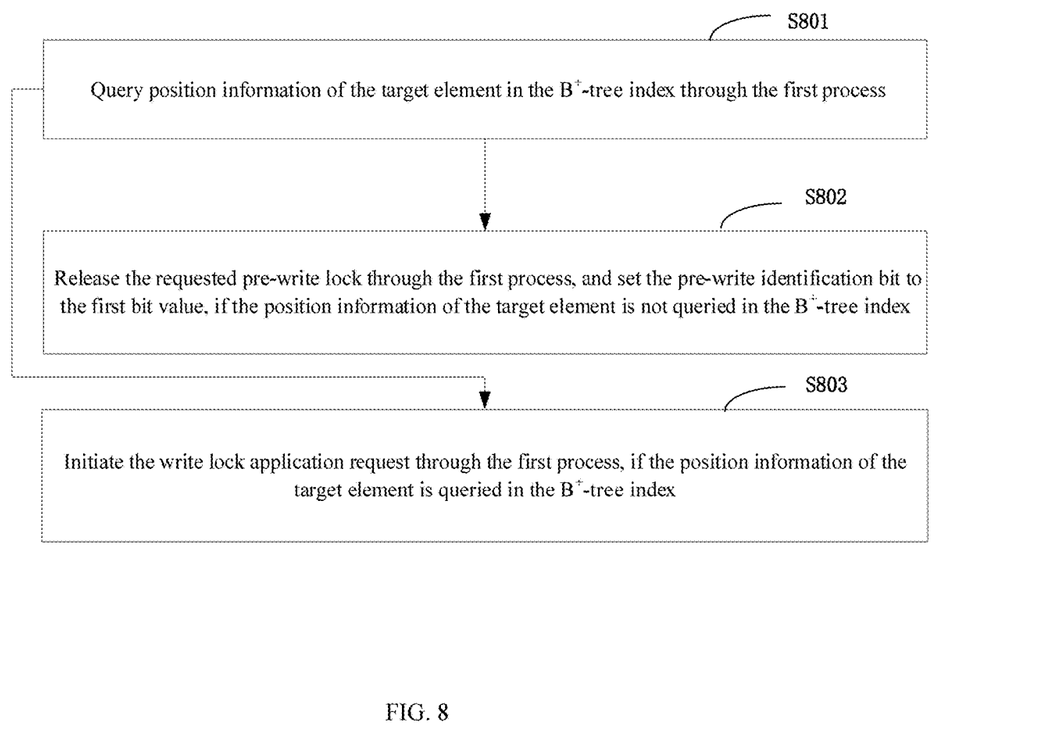
FIG. 8 is a specific implementation flowchart of a data read-write control method provided in a sixth embodiment of the present application.

FIG. 8 shows a specific implementation flowchart of the data read-write control method provided in the sixth embodiment of the present application. Referring to FIG. 8, compared to the embodiment described in any one of FIG. 1 to FIG. 6, the data read-write control method provided by this embodiment further includes: S801 to S803, which are described in detail as follows:

Further, the target data is a B$^+$-tree index, and the data editing operation is a deletion operation on a target element in the target data;

After if the pre-write identification bit is the first bit value, feedbacking the pre-write approval instruction to the first process, setting the pre-write identification bit to the second bit value, the method further includes:

In S801, position information of the target element is queried in the B+-tree index through the first process;

In S802, the requested pre-write lock is released through the first process, and the pre-write identification bit is set to the first bit value, if the position information of the target element is not queried in the B+-tree index;

In S803, the write lock application request is initiated through the first process, if the position information of the target element is queried in the B+-tree index.

In this embodiment, the above-mentioned data editing operation is specifically to delete the nodes in the B+-tree index. In this case, the above-mentioned implementation process may specifically include the following steps:

a) The first process can apply to the electronic device for adding a pre-write lock to the B+-tree, that is, a pre-write lock application request.

b) After the first process receives an instruction of successfully applying the pre-write lock fedback by the electronic device (the electronic device will set the pre-write identification bit "pw" in the read-write parameters to one, and the write identification bit is zero at this time), the first process starts to search the B+-tree, starting from the root node, and finds a leaf node and a position of the element to be deleted. This operation process of the first process is a pre-write operation.

c) If the first process fails to find, that is, the element does not exist, the pre-write lock is released, and the process is terminated; otherwise, it enters step d).

d) If the first process obtains position information of a target element, the first process applies to the electronic device for converting the pre-write lock into an exclusive write lock.

e) After the first process successfully applies for a write lock (the write lock is set to one, at this time "pw" is set to one, and read lock is set to zero), deletes the element from the position of the corresponding leaf node, and completes a node merge operation.

f) The write lock is released (both "pw" and "write" in read-write parameters are set to zero), and a process of deleting elements is completed.

Compared with above deletion of nodes, a process of inserting elements specifically includes the following steps:

a) The first process first applies to the electronic device for adding a pre-write lock to the B+-tree;

b) After the first process successfully applies for the pre-write lock from the electronic device (the "pw" in the read-write parameters is set to one, and the "write" in the read-write parameters is zero at this time), the first process starts to search the B+-tree and starting from the root node, finds an appropriate leaf node and a position where the new element needs to be inserted. This operation process of the first process is a pre-write operation;

c) After the first process finds the leaf node and the position, for example, a position of the target element, the first process applies for converting the pre-write lock into an exclusive write lock.

d) After the first process successfully applies for the write lock ("write" in the read-write parameters is set to one, at this time "pw" is set to one, and "read" is set to zero), writes the element to the corresponding node and the position, and completes a node split operation.

e) The first process releases the write lock ("pw" and "write" in the read and write parameters are both set to zero), and an element insertion process is completed.

It should be understood that sequence numbers of the steps in the above embodiments do not mean an execution order, and the execution order of each process should be determined by its function and internal logic, and should not constitute any limitation to the implementation process of the embodiments of the present application.

Figure 9:
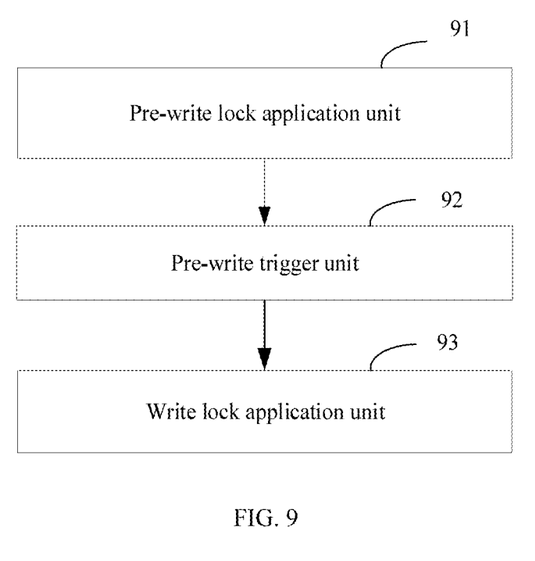
FIG. 9 is a structural block diagram of a data read-write control device provided by an embodiment of the present application.

FIG. 9 shows a structural block diagram of a data read-write control device provided by an embodiment of the present application. Units included in the data read-write control device are used to execute the steps in the embodiments corresponding to FIG. 1. For details, please refer to FIG. 1 and related descriptions in the embodiments corresponding to FIG. 1. For ease of description, only parts related to this embodiment are shown.

Referring to FIG. 9, the data read-write control device includes:

A pre-write lock application unit 91 is configured to determine read-write parameters of target data, in response to a pre-write lock application request for the target data initiated by a first process, the read-write parameters including a pre-write identification bit and a write identification bit;

A pre-write trigger unit 92 is configured to feedback a pre-write approval instruction to the first process if the pre-write identification bit is a first bit value, setting the pre-write identification bit to a second bit value, and controlling the first process to perform a pre-write operation based on a requested pre-write lock; when the pre-write identification bit is the second bit value, blocking responses to a pre-write lock application request and a write lock application request initiated by other process except the first process, and responding to a read lock application request initiated by the other process;

A write lock application unit 93 is configured to perform a data editing operation on the target data, in response to a write lock application request for the target data initiated by the first process, the write lock application request being initiated after the first process has completed the pre-write operation.

Optionally, the pre-write trigger unit 92 includes:

A write lock application request response unit is configured to determine the read-write parameters of the target data in response to the write lock application request, the read-write parameters comprising a read identification bit;

A agree to the write lock execution unit is configured to feedback a write approval instruction to the first process if the read identification bit is a third bit value, set the write identification bit to the second bit value, and control the first process to perform the data editing operation based on a requested write lock, block responses to the pre-write lock application request, the write lock application request and the read lock application request initiated by the other process, when the write identification bit is the second bit value.

Optionally, the control device also includes:

A read operation waiting unit is configured to determine a number of processes currently performing a read operation based on the read identification bit, if the read identification bit is other bit value except the third bit value;

A read operation waiting completion unit is configured to adjust a bit value of the read identification bit until an adjusted read identification bit is the third bit value in response to a read lock release instruction feedbacked by other process performing the read operation, then execute the "feedbacking the write approval instruction to the first process, set the write identification bit to the second bit value".

Optionally, the control device also includes:

A read lock application unit is configured to determine the read-write parameters of the target data, in response to a read lock application request for the target data initiated by a second process, the read-write parameters comprising a read identification bit;

A read lock application consent unit is configured to feedback a read approval instruction to the second process if the write identification bit is the first bit value, increase a value of the read identification bit, and control the second process to perform a read operation based on a requested read lock.

Optionally, the control device also includes:

A write lock application unit is configured to the read-write parameters of the target data in response to a write lock application request for the target data initiated by a third process, the read-write parameters comprising a read identification bit;

A write lock application approval unit is configured to feedback a write approval instruction to the third process if the pre-write identification bit and the write identification bit are first bit values, and the read identification bit is the third bit value, set the write identification bit to the second bit value, and control the third process to perform the data editing operation on the target data.

Optionally, the control device also includes:

An element address pending unit is configured to initiate the pre-write lock application request through the first process, if an element address of the data editing operation is not determined;

An element address known unit is configured to initiate the write lock application request through the first process, if the element address of the data editing operation has been determined.

Optionally, the target data is a $B^+$-tree index, and the data editing operation is a deletion operation on a target element in the target data;

The control device also includes:

A location information query unit is configured to query position information of the target element in the $B^+$-tree index through the first process;

A write-ahead lock releasing unit is configured to release the requested pre-write lock through the first process, and setting the pre-write identification bit to the first bit value, if the position information of the target element is not queried in the $B^+$-tree index;

A location confirmation unit is configured to initiate the write lock application request through the first process, if the position information of the target element is queried in the $B^+$-tree index.

Another embodiment of the present application also provides a data read-write control device, which is used for allocating a pre-write lock, a write lock, and a read lock according to read-write parameters, wherein the read-write parameters include a pre-write identification bit, a write identification bit and a read identification bit;

When the pre-write identification bit is a first bit value, allowing to respond to a pre-write application request initiated by thread, distributing the pre-write lock to a process that initiated the pre-write application request, and after distributing the pre-write lock to any process, setting the pre-write identification bit is a second bit value;

When the pre-write identification bit is the second bit value, blocking responses to a pre-write lock application request and a write lock application request initiated by a thread, and responding to a read lock application request initiated by a process.

The data read-write control device is also used for:

When the write identification bit and the pre-write lock identification bit are both the first bit value, allowing to respond to a write application request initiated by a thread, and when the read identification bit is a third bit value, allocating the write lock to a process that initiated the write application request, and after allocating a write lock to any process, setting the write identification bit to the second bit value;

When the write identification bit is the second bit value, blocking responses to a pre-write application request, a write application request and a read application request initiated by a thread.

The data read-write control device is also used for:

When the read identification bit is the third bit value, allowing to respond to the write application request initiated by a thread;

When the write identification bit is the first bit value, allowing to respond to the read application request initiated by a process, and allocating the read lock to a process that initiated a read application request, and configuring the read identification bit according to a number of allocated read locks.

Therefore, the electronic device provided by the embodiments of the present application can also add a corresponding pre-write identification bit on the basis of the write identification bit in the read-write parameters. When a thread needs to perform a write operation that is addressed first, a pre-write lock application request can be initiated. When it is detected that the pre-write identification bit is the first bit value, the pre-write approval instruction is fed back to the thread, that is, the pre-write lock is requested from the thread, and the pre-write operation can be performed. During the pre-write operation, the thread can complete an addressing task and allow other processes to read the target data. After the addressing task is completed, the process can initiate a write lock application request, and perform subsequent data editing operation. By writing the target data, realizing concurrent operations on the same target data. Compared with the existing control technology of read-write data, the present application enters a pre-write stage before writing data, and the process can complete an addressing operation through the pre-write lock. Allowing other read operations in the pre-write stage can avoid conflicts between write operations and at the same time reduce exclusive time of data during an addressing process, greatly improving a shared read ability of data.

Figure 10:
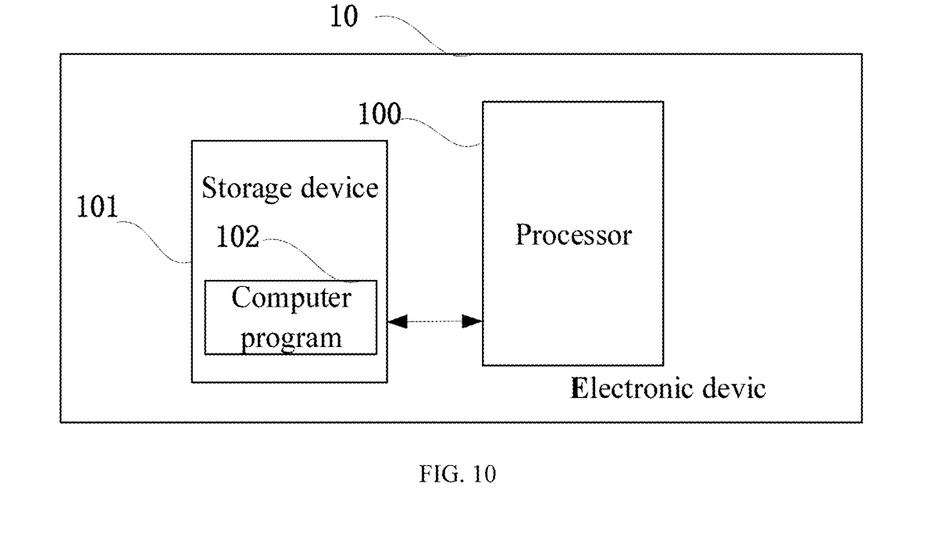
FIG. 10 is a schematic diagram of an electronic device provided by an embodiment of the present application.

FIG. 10 is a schematic diagram of the electronic device provided by an embodiment of the present application. As shown in FIG. 10, the electronic device 10 of this embodiment includes a processor 100, a storage device 101, and computer program 102 stored in the storage device 101 and operable on the processor 100, such as a data read-write control program. When the processor 100 executes the computer program 102, steps are implemented in the embodiments of the data read-write control method, such as S101 to S103 described in FIG. 1. Alternatively, when the processor 100 executes the computer program 102, functions of the units in above-mentioned device embodiments are implemented, for example, functions of the unit 91 to unit 93 in FIG. 9.

Exemplarily, the computer program 102 may be divided into one or more units, and the one or more units are stored in the storage device 101 and executed by the processor 100 to complete the present application. The one or more units may be a series of computer program instruction segments capable of accomplishing specific functions, and the instruction segments are used to describe the execution process of the computer program 102 in the electronic device 10.

The electronic device may include, but not limited to a processor 100 and a storage device 101. Those skilled in the art can understand that FIG. 10 is only an example of the electronic device 10, and does not constitute a limitation to the electronic device 10. The electronic device may include more or fewer components than shown in the figure, or combine some components, or different components. For example, the electronic device may also include an input-output device, a network access device, a bus, and the like.

The processor 100 may be a Central Processing Unit (CPU), and may also be other general-purpose processors, Digital Signal Processor (DSP), Application SpecificIntegrated Circuit (ASIC), Field-Programmable Gate Array (FPGA) or other programmable logic devices, discrete gate or transistor logic devices, discrete hardware components, etc. A general-purpose processor may be a microprocessor, or the processor may be any conventional processor, or the like.

The storage device 101 may be an internal storage unit of the electronic device 10, such as a hard disk or memory of the electronic device 10. The storage device 101 may also be an external storage device of the electronic device 10, such as a plug-in hard disk equipped on the electronic device 10, a Smart Media Card (SMC), a Secure Digital (SD) card, Flash Card, etc. Further, the storage device 101 may also include both an internal storage unit of the electronic device 10 and an external storage device. The storage device 101 is used to store the computer program and other programs and data required by the electronic device. The storage device 101 can also be used to temporarily store data that has been output or will be output.

In addition, each functional unit in each embodiment of the present application may be integrated into one processing unit, each unit may exist separately physically, or two or more units may be integrated into one unit. Above-mentioned integrated units can be implemented in the form of hardware or in the form of software functional units.

Above-described embodiments are only used to illustrate the technical solutions of the present application, rather than to limit them. Although the present application has been described in detail with reference to the foregoing embodiments, those of ordinary skill in the art may modify the technical solutions described in the foregoing embodiments, or equivalent replacements for some of the technical features. However, these modifications or replacements do not deviate essence of corresponding technical solutions from spirit and scope of the technical solutions of the embodiments of the present application, and should be included in a protection scope of the present application.

The invention claimed is:

1. A data read-write control method, comprising:
   determining read-write parameters of target data, in response to a pre-write lock application request for the target data initiated by a first process, the read-write parameters comprising a pre-write identification bit and a write identification bit;
   in response that the pre-write identification bit is a first bit value, feedbacking a pre-write approval instruction to the first process, setting the pre-write identification bit to a second bit value, and controlling the first process to perform a pre-write operation based on a requested pre-write lock; in response that the pre-write identification bit is the second bit value, blocking responses to pre-write lock application requests and write lock application requests initiated by other process except the first process, and responding to read lock application requests initiated by the other process;
   performing a data editing operation on the target data, in response to a write lock application request for the target data initiated by the first process, the write lock application request being initiated after the first process has completed the pre-write operation.

2. The data read-write control method of claim 1, wherein performing the data editing operation on the target data, in response to the write lock application request for the target data initiated by the first process comprises:
   determining the read-write parameters of the target data in response to the write lock application request, the read-write parameters comprising a read identification bit;
   in response that the read identification bit is a third bit value, feedbacking a write approval instruction to the first process, setting the write identification bit to the second bit value, and controlling the first process to perform the data editing operation based on a requested write lock; blocking responses to the pre-write lock application requests, the write lock application requests and the read lock application requests initiated by the other process, in response that the write identification bit is the second bit value.

3. The data read-write control method of claim 2, wherein after determining the read-write parameters of the target data in response to the write lock application request, further comprises:
   determining a number of processes currently performing a read operation based on the read identification bit, if the read identification bit is other bit value except the third bit value;
   in response to a read lock release instruction feedbacked by other process performing the read operation, adjusting a bit value of the read identification bit until an adjusted read identification bit is the third bit value, then executing the "feedbacking the write approval instruction to the first process, setting the write identification bit to the second bit value".

4. The data read-write control method of claim 1, further comprising:
   determining the read-write parameters of the target data, in response to a read lock application request for the target data initiated by a second process, the read-write parameters comprising a read identification bit;
   in response that the write identification bit is the first bit value, feedbacking a read approval instruction to the second process, increasing a bit value of the read identification bit, and controlling the second process to perform a read operation based on a requested read lock.

5. The data read-write control method of claim 1, further comprising:
   determining the read-write parameters of the target data in response to a write lock application request for the target data initiated by a third process, the read-write parameters comprising a read identification bit;
   in response that the pre-write identification bit and the write identification bit are first bit values, and the read identification bit is the third bit value, feedbacking a write approval instruction to the third process, setting the write identification bit to the second bit value, and controlling the third process to perform the data editing operation on the target data.

6. The data read-write control method according to claim 1, before in response to the pre-write lock application request for the target data initiated by the first process, further comprising:
   initiating the pre-write lock application request through the first process, in response that an element address of the data editing operation is not determined;
   initiating the write lock application request through the first process, in response that the element address of the data editing operation has been determined.

7. The data read-write control method according to claim 1, wherein the target data is a B+-tree index, and the data editing operation is a deletion operation on a target element in the target data;
   after in response that the pre-write identification bit is the first bit value, feedbacking the pre-write approval instruction to the first process, setting the pre-write identification bit to the second bit value, the method further comprises:
   querying position information of the target element in the B+-tree index through the first process;
   releasing the requested pre-write lock through the first process, and setting the pre-write identification bit to the first bit value, in response that the position information of the target element is not queried in the B+-tree index;
   initiating the write lock application request through the first process, in response that the position information of the target element is queried in the B+-tree index.

8. An electronic device comprising:
   a processor; and
   a storage device storing computer program, which when executed by the processor, cause the processor to:
   determine read-write parameters of target data, in response to a pre-write lock application request for the target data initiated by a first process, the read-write parameters comprising a pre-write identification bit and a write identification bit;
   in response that the pre-write identification bit is a first bit value, feedback a pre-write approval instruction to the first process, set the pre-write identification bit to a second bit value, and control the first process to perform a pre-write operation based on a requested pre-write lock; in response that the pre-write identification bit is the second bit value, block responses to pre-write lock application requests and write lock application requests initiated by other process except the first process, and respond to read lock application requests initiated by the other process;
   perform a data editing operation on the target data, in response to a write lock application request for the target data initiated by the first process, the write lock application request being initiated after the first process has completed the pre-write operation.

9. The electronic device of claim 8, wherein the processor is further caused to:
   determine the read-write parameters of the target data in response to the write lock application request, the read-write parameters comprising a read identification bit;
   in response that the read identification bit is a third bit value, feedback a write approval instruction to the first process, set the write identification bit to the second bit value, and control the first process to perform the data editing operation based on a requested write lock; block responses to the pre-write lock application requests, the write lock application requests and the read lock application requests initiated by the other process, in response that the write identification bit is the second bit value.

10. The electronic device of claim 9, wherein the processor is further caused to:
    determine a number of processes currently performing a read operation based on the read identification bit, if the read identification bit is other bit value except the third bit value;
    in response to a read lock release instruction feedbacked by other process performing the read operation, adjust a bit value of the read identification bit until an adjusted read identification bit is the third bit value, then execute the "feedback the write approval instruction to the first process, set the write identification bit to the second bit value".

11. The electronic device of claim 8, wherein the processor is further caused to:
    determine the read-write parameters of the target data, in response to a read lock application request for the target data initiated by a second process, the read-write parameters comprising a read identification bit;
    in response that the write identification bit is the first bit value, feedback a read approval instruction to the second process, increase a bit value of the read identification bit, and control the second process to perform a read operation based on a requested read lock.

12. The electronic device of claim 8, wherein the processor is further caused to:
    determine the read-write parameters of the target data in response to a write lock application request for the target data initiated by a third process, the read-write parameters comprising a read identification bit;
    in response that the pre-write identification bit and the write identification bit are first bit values, and the read identification bit is the third bit value, feedback a write approval instruction to the third process, set the write identification bit to the second bit value, and control the third process to perform the data editing operation on the target data.

13. The electronic device of claim 8, wherein the processor is further caused to:
    initiate the pre-write lock application request through the first process, in response that an element address of the data editing operation is not determined;
    initiate the write lock application request through the first process, in response that the element address of the data editing operation has been determined.

14. The electronic device of claim 8, wherein the processor is further caused to:
    after in response that the pre-write identification bit is the first bit value, feedback the pre-write approval instruction to the first process, set the pre-write identification bit to the second bit value, the method further comprises:
    query position information of the target element in the B+-tree index through the first process;
    release the requested pre-write lock through the first process, and set the pre-write identification bit to the first bit value, in response that the position information of the target element is not queried in the B+-tree index;

initiate the write lock application request through the first process, in response that the position information of the target element is queried in the B+-tree index.

15. A computer-readable storage device having stored computer program, which when executed by a processor of an electronic device, causes the processor to perform a data read-write control method, the method comprising:
   determining read-write parameters of target data, in response to a pre-write lock application request for the target data initiated by a first process, the read-write parameters comprising a pre-write identification bit and a write identification bit;
   in response that the pre-write identification bit is a first bit value, feedbacking a pre-write approval instruction to the first process, setting the pre-write identification bit to a second bit value, and controlling the first process to perform a pre-write operation based on a requested pre-write lock; in response that the pre-write identification bit is the second bit value, blocking responses to pre-write lock application requests and write lock application requests initiated by other process except the first process, and responding to read lock application requests initiated by the other process;
   performing a data editing operation on the target data, in response to a write lock application request for the target data initiated by the first process, the write lock application request being initiated after the first process has completed the pre-write operation.

16. A computer-readable storage device of claim 15, wherein performing the data editing operation on the target data, in response to the write lock application request for the target data initiated by the first process comprises:
   determining the read-write parameters of the target data in response to the write lock application request, the read-write parameters comprising a read identification bit;
   in response that the read identification bit is a third bit value, feedbacking a write approval instruction to the first process, setting the write identification bit to the second bit value, and controlling the first process to perform the data editing operation based on a requested write lock; blocking responses to the pre-write lock application requests, the write lock application requests and the read lock application requests initiated by the other process, in response that the write identification bit is the second bit value.

17. A computer-readable storage device of claim 16, wherein after determining the read-write parameters of the target data in response to the write lock application request, further comprises:
   determining a number of processes currently performing a read operation based on the read identification bit, in response that the read identification bit is other bit value except the third bit value;
   in response to a read lock release instruction feedbacked by other process performing the read operation, adjusting a bit value of the read identification bit until an adjusted read identification bit is the third bit value, then executing the "feedbacking the write approval instruction to the first process, setting the write identification bit to the second bit value".

18. A computer-readable storage device of claim 15, further comprising:
   determining the read-write parameters of the target data, in response to a read lock application request for the target data initiated by a second process, the read-write parameters comprising a read identification bit;
   in response that the write identification bit is the first bit value, feedbacking a read approval instruction to the second process, increasing a bit value of the read identification bit, and controlling the second process to perform a read operation based on a requested read lock.

19. A computer-readable storage device of claim 15, further comprising:
   determining the read-write parameters of the target data in response to a write lock application request for the target data initiated by a third process, the read-write parameters comprising a read identification bit;
   in response that the pre-write identification bit and the write identification bit are first bit values, and the read identification bit is the third bit value, feedbacking a write approval instruction to the third process, setting the write identification bit to the second bit value, and controlling the third process to perform the data editing operation on the target data.

20. A computer-readable storage device of claim 15, wherein the target data is a B+-tree index, and the data editing operation is a deletion operation on a target element in the target data;
   after in response that the pre-write identification bit is the first bit value, feedbacking the pre-write approval instruction to the first process, setting the pre-write identification bit to the second bit value, the method further comprises:
   querying position information of the target element in the B+-tree index through the first process;
   releasing the requested pre-write lock through the first process, and setting the pre-write identification bit to the first bit value, in response that the position information of the target element is not queried in the B+-tree index;
   initiating the write lock application request through the first process, in response that the position information of the target element is queried in the B+-tree index.

* * * * *